United States Patent
Jansseune

(10) Patent No.: US 9,244,442 B2
(45) Date of Patent: Jan. 26, 2016

(54) NEAR FIELD COMMUNICATION METHOD, BETWEEN A MOBILE DEVICE AND A MOTOR VEHICLE AND CORRESPONDING DEVICE

(71) Applicants: CONTINENTAL AUTOMOTIVE FRANCE, Toulouse (FR); CONTINTENTAL AUTOMOTIVE GmbH, Hannover (DE)

(72) Inventor: Luc Jansseune, Venerque (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 118 days.

(21) Appl. No.: 14/024,841

(22) Filed: Sep. 12, 2013

(65) Prior Publication Data

US 2014/0070921 A1    Mar. 13, 2014

(30) Foreign Application Priority Data

Sep. 12, 2012  (FR) ..................... 12 58554

(51) Int. Cl.
| | |
|---|---|
| G05B 11/01 | (2006.01) |
| B60R 25/24 | (2013.01) |
| H04M 1/725 | (2006.01) |
| H04W 4/04 | (2009.01) |

(Continued)

(52) U.S. Cl.
CPC ............. *G05B 11/01* (2013.01); *B60R 25/24* (2013.01); *H04M 1/7253* (2013.01);
(Continued)

(58) Field of Classification Search
CPC .... G05B 11/01; H04M 1/7253; H04W 4/046; H04W 12/06; H04W 4/008; B60R 25/24; G07C 2009/00555; H04L 69/01
USPC ......... 340/5.72, 5.61, 5.63, 426.36; 307/10.5; 455/41.4
See application file for complete search history.

(56) References Cited

U.S. PATENT DOCUMENTS 5,204,672 A * 4/1993 Brooks ...................... 340/12.22
2008/0024322 A1* 1/2008 Riemschneider et al. .... 340/904

(Continued)

FOREIGN PATENT DOCUMENTS

WO    2004/114227 A1    12/2004

OTHER PUBLICATIONS

Nitesh Saxena et al.: "Vibrate-to-unlock: Mobile phone assisted user authentication to multiple personal RFID tags" Pervasive Computing and Communications (PERCOM), 2011 IEEE International Conference ON, IEEE, Mar. 21, 2011, pp. 181-188, XP031868403, 001: 10.1109/PERCOM, 2011, 5767583, ISBN: 978-1-4244-9530-6, *abrege * p. 181, colonne de droite, dernier alinea—p. 182, colonne de gauche, alinea 3* p. 183, colonne de gauche, alinea 3-colonne de droite, alinea, Cited in French Search Report.

(Continued)

*Primary Examiner* — Edwin Holloway, III
(74) *Attorney, Agent, or Firm* — Young & Thompson

(57) ABSTRACT

A near field communication method between a vehicle and a mobile device includes the following steps:
  establishing a contact between the mobile device and vibration elements,
  installing vibration elements in a communication device mounted on the vehicle, the vibration elements adapted to emit a predetermined vibratory signal,
  installing an element for detecting and analyzing vibrations in the mobile device,
  implementing an authentication procedure between the communication device and the mobile device in which:
    the communication device of the vehicle emits toward communication elements of the mobile device, a request signal by near field communication and by vibratory signal, and
    the communication elements of the mobile device emits, in return, a response signal to the vehicle only if it has received a near field signal and a vibratory signal according to a predetermined format. A device for implementing this method is also described.

10 Claims, 1 Drawing Sheet

(51) Int. Cl.
  *H04W 4/00* (2009.01)
  *H04L 29/06* (2006.01)
  *H04W 12/06* (2009.01)
  *G07C 9/00* (2006.01)

(52) U.S. Cl.
  CPC .... *H04W 4/046* (2013.01); *G07C 2009/00555* (2013.01); *H04L 69/18* (2013.01); *H04W 4/008* (2013.01); *H04W 12/06* (2013.01)

(56) References Cited

U.S. PATENT DOCUMENTS

2008/0113619 A1* 5/2008 Torrance et al. ............ 455/41.2
2010/0075656 A1 3/2010 Howarter et al.
2012/0167232 A1* 6/2012 Moosavi et al. ............... 726/29
2012/0232964 A1* 9/2012 Brands ........................... 705/13

OTHER PUBLICATIONS

Aurelien Francillon et al.: "Relay Attacks on Passive Keyless Entry and Start Systems in Modern Cars", International Association for Cryptologic Research, vol. 20101021:205436, Oct. 21, 2010 pp. 1-15, XP061004286, [extrait le Oct. 21, 2010], * abrege * * p. 3, colonne de droite, alinea 4 *, Cited in FR Search Report.

French Search Report, dated Jun. 13, 2013, from corresponding French application.

* cited by examiner

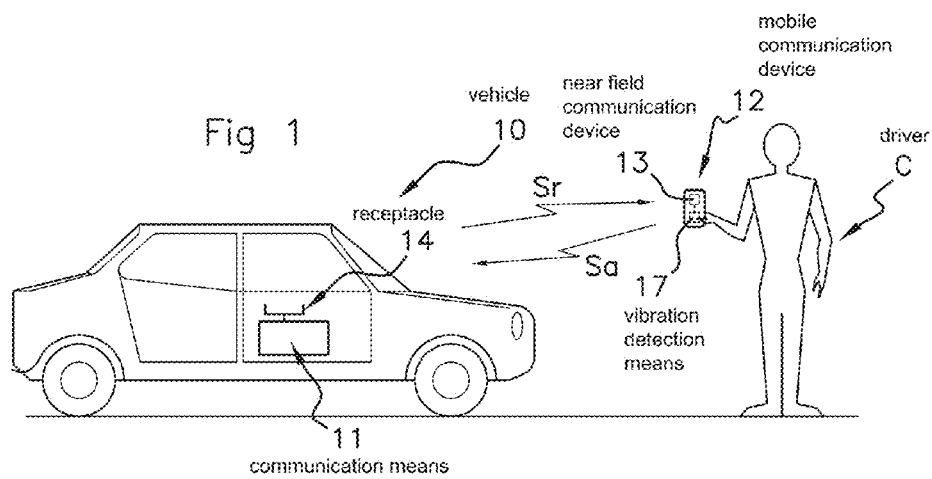
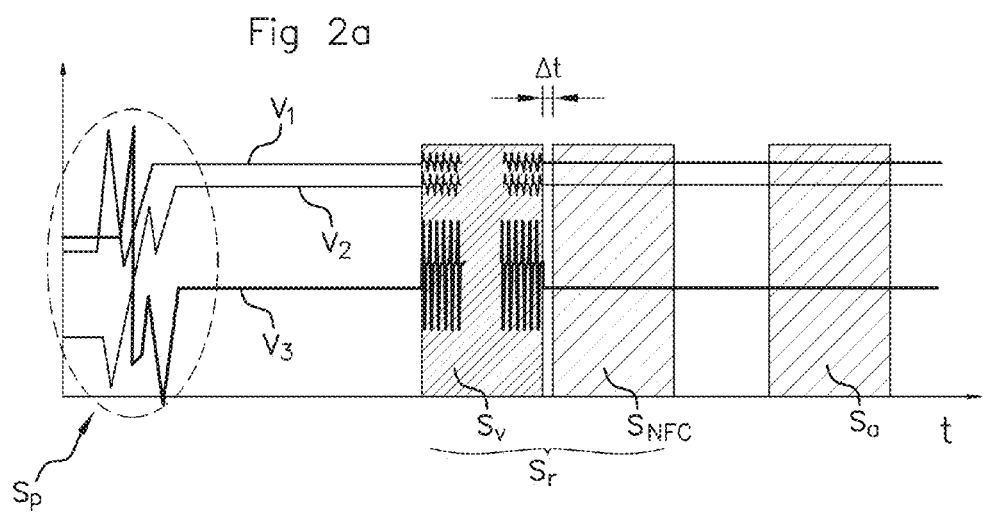
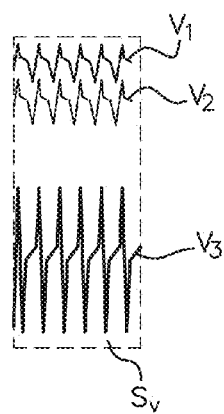
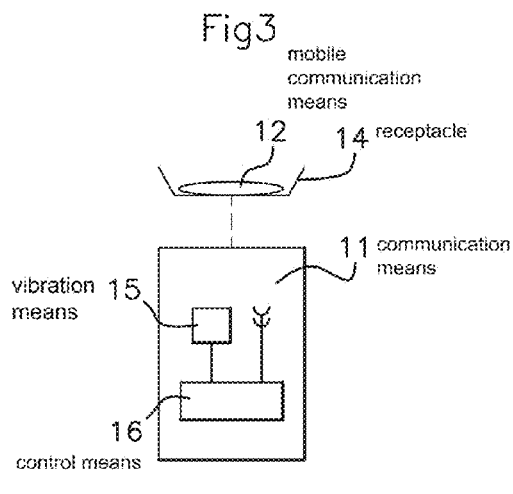

NEAR FIELD COMMUNICATION METHOD, BETWEEN A MOBILE DEVICE AND A MOTOR VEHICLE AND CORRESPONDING DEVICE

FIELD OF THE INVENTION

The present invention relates to a near field communication method, between a mobile device and a motor vehicle. Particularly, the mobile device is, for example, a cell phone or a smart badge for accessing and/or the hands-free starting of a vehicle. The invention extends to the device implementing such a method.

BACKGROUND OF THE INVENTION

It is already known practice to use a mobile device (smart card or cell phone), to access and/or start up a motor vehicle. The access and/or start-up authorization is given by the vehicle following a question/answer exchange between the vehicle and the mobile device. Conventionally, this exchange of data is performed by radiofrequency (RF) communication, low frequency (LF), Bluetooth, Wi-Fi, NFC (Near Field Communication) type.

For security reasons, the near field communications are preferred because they require the mobile device and the vehicle to be in immediate proximity to one another (distance less than 10 cm). This short distance is an a priori guarantee of enhanced security. This is because, by proceeding in this way, the possibility of the mobile device being spoofed is avoided, because, for that, it would be necessary to introduce a fraudulent element between the mobile device and the vehicle, which could not fail to draw the attention of the legitimate owner of the vehicle.

However, it so happens that, when the legitimate owner of the vehicle is far away from the vehicle, if an ill-intentioned person has, close to the vehicle, a first fraudulent electronic communication device and a second fraudulent communication device close to the legitimate owner, the information requested by the vehicle could be relayed by the two fraudulent electronic devices to the mobile device of the legitimate owner, even though the latter is a long way away from his or her vehicle. Because of this, an authorization to access and/or start up the vehicle could take place, in the absence of and unnoticed by the legitimate owner, even by using a so-called "near field" communication mode.

In practice, the fact that the mobile device of the owner of the vehicle uses a near field communication (NFC) does not provide protection from an ill-intentioned person managing to place a fraudulent communication device in proximity to the latter. Thus, for example, if the owner of the vehicle has a cell phone in his or her pocket and is approached (sufficiently close) by an ill-intentioned person also having a cell phone in his or her pocket, there could be an exchange of data between the two telephones without the legitimate owner noticing it. The very short distance necessary for a near field communication is not therefore totally sufficient to guarantee the inviolability of the communications between a vehicle and a device for accessing and/or starting up this vehicle.

SUMMARY OF THE INVENTION

The aim of the present invention is to mitigate this problem and to guarantee that it will not be possible to insert fraudulent electronic communication devices between a vehicle and a legitimate mobile device paired with this vehicle; when the communication between the vehicle and the paired mobile device is performed according to the so-called "near field" (NFC) technology.

To this end, the present invention relates to a method of communication between a vehicle and a mobile device, the communication between said vehicle and said mobile device being carried out according to a so-called near field technology, said method comprising the following steps:
  installation of near field communication means respectively in the vehicle and in the mobile device.

The method according to the invention also comprises the following steps:
  installation of a vibration means in the communication device mounted on the vehicle, said vibration means being adapted to emit a predetermined vibratory signal,
  establishing a contact between the mobile device and the vibration means,
  installation of a means for detecting and analyzing vibrations in the mobile device,
  implementation of an authentication procedure between the communication means of the vehicle and of the mobile device in which:
    the communication means of the vehicle emit, toward the communication means of the mobile device, a request signal by near field communication and by vibratory signal, and
    the communication means of the mobile device emits, in return, a response signal to the vehicle only if it has received a near field signal and a vibratory signal according to a predetermined format.

Thus, the method according to the invention consists in emitting a vibratory signal upon the emission of the near field request signal and in conditioning the response from the mobile device to this request signal on the reception of these two signals emitted according to a predetermined format. By requiring the mobile device to receive a vibratory signal, it is thus impossible for this vibratory signal to be transmitted by a fraudulent electronic device. In practice, that would require the fraudulent device to be in direct contact with the mobile device of the legitimate owner, and even in certain cases, it would require exact positioning of the fraudulent mobile device relative to the legitimate mobile device. Now, such direct contact between a fraudulent device and the mobile device of the legitimate owner of the vehicle cannot be achieved unnoticed by the latter. It is therefore no longer possible to fraudulently relay a near field communication between a vehicle and a mobile device paired with that vehicle, because a direct contact between the fraudulent device and the mobile device of the legitimate owner is necessary.

Preferentially, the vibratory signal emitted by the communication means of the vehicle is a coded signal.

Advantageously, the predetermined format of the vibratory signal constitutes a coding of this signal. This coding can be a time coding, in which case the coded signal is emitted in a predetermined time interval relative to the emission of the near field communication signal. This coding can also be linked to the fact that it contains specific data or that it has predetermined characteristics (signature (trend in time), form, intensity).

Advantageously, the authentication step of the communication method according to the invention can be implemented in a procedure for hands-free access to the vehicle and/or in a procedure for starting up said vehicle.

The present invention extends to the communication device mounted on the vehicle and implementing the method according to the invention.

BRIEF DESCRIPTION OF THE DRAWINGS

Other objects, features and advantages of the present invention will emerge from the following detailed description given as a nonlimiting example, with reference to the attached drawings in which:

FIG. 1 is a schematic view representing the different elements implemented in the method according to the invention, FIG. 2a is a schematic view illustrating an exemplary request signal Sr format and response signal Sa format according to the invention, FIG. 2b is a schematic view illustrating an exemplary vibratory signal Sv according to the invention, and FIG. 3 is a schematic view illustrating a communication device of the vehicle according to the invention.

DETAILED DESCRIPTION OF THE INVENTION

According to the embodiment represented in FIGS. 1 to 3, a vehicle 10 is provided with near field communication means 11 (NFC). Such means are known per se and will not be detailed here. Reference for this can be made to the patent application (in the name of the applicant) FR 2 963 711 illustrating such near field communication means.

A driver C (legitimate owner of the vehicle 10) is provided with a mobile communication device 12, for example a cell phone. This mobile communication device 12 is in turn provided with near field communication means 13.

In a known manner, a dialogue is set up between the communication means of the vehicle 11 and the near field communication means 13 of the mobile device 12, when the latter are placed in proximity to one another. In the context of the NFC technology, the distance between the two communication means is of the order of a few centimeters.

The purpose of the dialogue which is set up between the communication means 13 of the mobile device 12 and the communication means 11 of the vehicle is to implement an authentication procedure between these two elements 11, 13 so as to activate a procedure for hands-free access to the vehicle and/or to start up the vehicle. Since these two procedures are otherwise known, they will not be detailed here.

The communication means 11 mounted in the vehicle, for implementing the procedure for starting up a vehicle, are associated with a receptacle 14 in the form of a cradle intended to receive the mobile device 12 (for example a cell phone). This receptacle is usually placed on the dashboard or between the two front seats of the vehicle. It could, however, be placed in another appropriate position in the vehicle without departing from the framework of the present invention. As is known, the mobile device 12 of the legitimate owner of the vehicle is placed in this receptacle prior to implementing the start-up procedure. Mobile device 12 is therefore in direct contact with receptacle 14.

According to the invention, this receptacle 14 is also provided with vibration means 15 (FIG. 3), adapted to transmit a vibratory signal Sv (FIG. 2a) to the mobile device 12, when the latter is placed in the receptacle 14. A contact is therefore created (via receptacle 14) between mobile device 12 and vibration means 15 provided in receptacle 14. These vibration means 15 consist, for example, of an electromagnet or a piezoelectric element or a micromotor with an eccentric, controlled by a control means 16 (FIG. 3). Such a control means 16 consists, for example, of an electronic control unit.

The vibratory signal Sv can thus be modulated in amplitude and in time and thus constitutes a coded signal. This vibratory signal Sv may be made up of a plurality of individual vibratory signals V1, V2, V3 ... (FIG. 2a). As FIG. 2b shows, the individual vibratory signals V1 to V3 can have different forms and different levels. These signals can be repeated a certain number of times (2 times in FIG. 2a) to constitute a vibratory signal Sv.

As a variant, instead of repeating the same individual vibratory signals V1 to V3 several times to constitute the vibratory signal Sv, it is possible to define a number of groups of individual vibratory signals that are all different to produce a vibratory signal Sv.

The authentication procedure implemented prior to a procedure for accessing the vehicle or for starting up the vehicle consists in the emission, by the communication means 11 of the vehicle, of a request signal Sr comprising a predetermined combination of vibratory signals Sv and of NFC signals, $S_{NFC}$ (FIG. 2a).

For example in FIG. 2a, the request signal Sr is made up of a vibratory signal Sv comprising three individual vibratory signals V1 to V3 repeated twice, and one NFC signal, $S_{NFC}$, separated by a time interval $\Delta t$.

Thus, it will be noted that the vibratory signal Sv is emitted by the communication means 11 of the vehicle 10 in a predetermined time interval relative to the emission of the NFC signal, $S_{NFC}$.

As a variant, the emission of the vibratory Sv and near field $S_{NFC}$ signals can be simultaneous. In practice, the NFC and vibratory signals each have distinct detection and analysis means which makes it possible to perceive them and analyze them at the same time. The NFC signal uses a so-called "single wire" protocol and the vibratory signals are analyzed in a known manner by a specific (and distinct) application of the mobile device.

In a preliminary procedure for learning the format of the request signal Sr, the form, the trend over time (signature), the intensity and/or any other characteristics of the request signal Sr emitted by the communication means 11 of the vehicle, are learned by the legitimate mobile device 12 paired with the vehicle.

For this, the mobile device 12 is placed by the legitimate owner in direct contact with the receptacle 14 of the communication means of the vehicle. Thus a contact is provided between the mobile device 12 and the vehicle communication means 11. This contact may be direct or be realized via intermediary part(s) between communication means 11 and mobile device 12. In the described embodiment, the intermediary part consists in receptacle 14. A vibratory signal Sv is created by the control means 16. This vibratory signal Sv is emitted by the vibration means and is associated with a conventional NFC (near field) signal, $S_{NFC}$. The mobile device 12 is provided with means 17 for detecting and analyzing the vibratory and NFC signals. This detection and analysis means stores the format (amplitude, number of vibrations, repetitions, time sequence, etc.) of the signal Sr perceived by the mobile device. In particular, the time interval separating the vibratory signals Sv and NFC, $S_{NFC}$, is stored.

The set of characteristics of the request signal Sr emitted by the communication means 11 of the vehicle and received by the mobile device is thus stored in the mobile device as the predetermined format of the request signal.

It will be noted that the learning procedure makes it possible to take into account all the characteristics of the request signal sent by the legitimate mobile device (including any geometrical defect or particular resonance thereof in the receptacle 14). Thus, the characteristics learned during the learning procedure are linked to a unique receptacle/legitimate mobile device pairing.

Thereafter, the mobile device 12 will compare any request signal Sr sent by the vehicle to the stored format and will respond to the communication means 11 of the vehicle by a response signal Sa only if the format of the request signal is indeed the one stored.

By combining a vibratory signal Sv with the conventional NFC signal, $S_{NFC}$, the invention requires any ill-intentioned person to place a fraudulent communication device directly in contact with the legitimate mobile device in order to spoof it. In practice, it is not possible to transmit a vibratory signal between a fraudulent communication device and a mobile device without contact. The vibrations are transmitted correctly only by contact. Because of this, the owner of the legitimate mobile device will notice it. It will therefore no longer be possible to transmit data remotely between the fraudulent device and the legitimate mobile device.

It will also be noted that, if an analysis is performed on the vibratory signal received, for example by analyzing the signature of the vibratory signal received, a simple contact between the legitimate mobile device and the fraudulent mobile device is not sufficient to transmit the vibratory signal to the legitimate mobile device. In practice, it is also necessary to obtain an exact positioning between the two mobiles (legitimate and fraudulent), which renders a fraudulent implementation of the access and/or start-up procedures almost impossible.

Since the legitimate mobile device responds to the request signal Sr with a response signal Sa only if the format of the request signal Sr is the predetermined format stored during the learning procedure, the legitimate mobile device will never return any response signal if a signal in the predetermined format is not received. Because of this, the vehicle will prevent the fraudulent communication device from accessing it and starting it up.

The invention therefore makes it possible to avoid an act of spoof of the legitimate mobile device 12 when the latter uses a near field communication NFC.

Implementing the method according to the invention entails:
  installing near field communication means 11, 13 respectively in the vehicle 11 and in the mobile device 12,
  establishing a contact between the mobile device and the vibration means,
  installing a vibration means 15 in the communication device 11 mounted on the vehicle, said vibration means being adapted to emit a predetermined vibratory signal Sv,
  installing a means 17 for detecting and analyzing vibrations in the mobile device 12,
  implementing an authentication procedure between the communication means 11, 13 of the vehicle and of the mobile device in which:
    the communication means 11 of the vehicle 10 emit, toward the communication means 13 of the mobile device 12, a request signal Sr, by near field communication $S_{NFC}$ and by vibratory signal Sv, and
    the communication means 13 of the mobile device emits, in return, a response signal Sa to the vehicle 10 only if it has received a near field signal $S_{NFC}$, and a vibratory signal Sv, according to a predetermined format.

It will be noted (FIG. 2a) that the placing of a mobile device 12 in the receptacle 14 produces a vibratory signal Sp at the moment when the mobile device 12 comes into contact with the receptacle 14. Because of this, it is possible to combine this vibratory signal Sp with an NFC signal, $S_{NFC}$, emitted after a predetermined time interval (for example 10 s after the placing of the mobile device 12 in the receptacle 14) to create a simplified request signal Sr, without adding specific vibration means in the receptacle 14. Obviously, here again, a preliminary procedure for learning the signal Sp is necessary. This is an inexpensive implementation of the invention.

It will be noted that the method according to the invention has been described for reasons of clarity in conjunction with a procedure for starting up the vehicle, but it could equally be implemented with a procedure for accessing the vehicle. In this case, the vibration means are, for example, located in a handle of the vehicle.

In order to implement the invention, all that is required is to provide the receptacle 14 with vibration means 15 and control means 16 for these vibration means. These two means are inexpensive simple and conventional components. The mobile device 12 should also be provided with means 17 for detecting and analyzing vibrations (for example an accelerometer and its associated management program). These means are very often already present on the latest generation mobile devices. All the other NFC communication means, 11, 13, on the vehicle 10 and on the mobile device 12, are of a type commonly used.

The cost of the various components to be added is therefore extremely low.

It will be noted that the addition of a vibratory signal to the NFC signal, in addition to the fact that it makes it possible to avoid a fraudulent implementation of the procedures for accessing and/or starting up the vehicle, also makes it possible to inform the driver (through vibrations) that:
  the mobile device has been rejected (if it has not been identified for example),
  the mobile device is wrongly positioned in the receptacle,
  the mobile device has been left in the receptacle (on opening a door for example),
  etc.

It will be noted that the use of sounds (sound waves) as vibratory signals is excluded because they could be transmitted remotely by a fraudulent communication device. To this end, the vibration signal used in the present invention preferably has characteristics that cannot be reproduced by sound waves. It should, however, be noted that the use of sound waves by a fraudulent communication device is inappropriate because that would alert the legitimate owner of the mobile device.

Obviously, the present invention is not limited to the embodiment described above and encompasses any variant within the scope of a person skilled in the art. Thus, as a variant, it is possible to have the mobile device 12 vibrate and have this vibration detected and analyzed in the receptacle 14. In this case, if the receptacle 14 does not perceive the predetermined vibratory signal, it does not allow the access or start-up procedure to continue.

The invention claimed is:

1. A method of communication between a vehicle (10) and a mobile device (12), the communication between said vehicle and said mobile device being carried out according to near field (NFC) technology, said method comprising the following steps:
  installation of a first near field communication means (11) in the vehicle, and a second near field communication means (13) in the mobile device (12), wherein the first and second near field communication means (11, 13) communicate with each together by near field communications, the first near field communication device (11) being associated with a receptacle (14) mounted onto the vehicle (10),
  installation of a vibration means (15) in the first near field communication device (11) associated with the receptacle (14) mounted onto the vehicle (10), said vibration means being adapted to emit a predetermined vibratory signal (Sv) when the mobile device (12) is placed in the receptacle (14), establishing a direct contact between the mobile device (12) and vibration means (15), installation of a means (17) for detecting and analyzing vibrations in the mobile device (12), implementation of an authentication procedure between the first and second near field communication means (11, 13) of the vehicle and of the mobile device in which:

when the mobile device (12) is placed in the receptacle (14), the first near field communication means (11) of the vehicle emits a request signal (Sr) toward the second near field communication means (13) of the mobile device, the request signal (Sr) comprising a predetermined combination of vibratory signals (Sv) and of near field communications signals (Snfc), and the second near field communication means (13) of the mobile device (12) emits, in return, a response signal (Sa) to the vehicle only when the second near field communication means (13) has received the request signal according to a predetermined format.

2. The communication method as claimed in claim 1, wherein the vibratory signal (Sv) is a coded signal.

3. The communication method as claimed in claim 1, wherein the vibratory signal (Sv) is emitted by the first near field communication means (11) of the vehicle in a predetermined time interval relative to the emission of the near field communication signal ($S_{NFC}$).

4. The communication method as claimed in claim 1, wherein the vibratory (Sv) and near field ($S_{NFC}$) signals are emitted simultaneously.

5. The communication method as claimed in claim 1, wherein the method is is implemented as part of a procedure for hands-free access to the vehicle.

6. The communication method as claimed in claim 1, wherein the method is implemented as part of a vehicle starting procedure.

7. A near field communication device mounted in a motor vehicle, comprising:
   a receptacle (14) mounted onto the vehicle (10);
   a first near field communication means (11) installed in the vehicle, wherein the first near field communication mean (11) is configured to communicate with a second near field communication means (13) in a mobile device (12) by near field communications, the mobile device including a means (17) for detecting and analyzing vibrations in the mobile device (12),
   the first near field communication device (11) being associated with the receptacle (14) mounted onto the vehicle (10); and
   a vibration means (15) installed in the first near field communication device (11), said vibration means being adapted to emit a predetermined vibratory signal (Sv) when the mobile device (12) is placed in the receptacle (14), wherein a direct contact is established between the mobile device (12) and vibration means (15),
   wherein, the first near field communication means (11) is configured so that when the mobile device (12) is placed in the receptacle (14), the first near field communication means (11) emits a request signal (Sr) toward the second near field communication means (13), the request signal (Sr) comprising a predetermined combination of vibratory signals (Sv) and of near field communications signals (Snfc), and
   wherein the second near field communication means (13) of the mobile device (12) emits, in return, a response signal (Sa) to the vehicle only when the second near field communication means (13) has received the request signal according to a predetermined format.

8. The device as claimed in claim 7, wherein the vibration means (15) is an electromagnet or a piezoelectric element or a micromotor with an eccentric.

9. The device as claimed in claim 6, in combination with the mobile device (12) comprising the second near field communication means (13).

10. A method of communication between a vehicle (10) and a mobile device (12), said method comprising the steps of:
   installing a first near field communication means (11) in the vehicle, the first near field communication device (11) comprising a vibration generating means (15) provided in a receptacle (14) mounted in the vehicle (10), said vibration generating means being adapted to emit a predetermined vibratory signal (Sv) when the mobile device (12) is placed in the receptacle (14);
   installing i) a second near field communication means (13) and ii) a means (17) for detecting and analyzing vibrations in the mobile device (12);
   having the first and second near field communication means (11, 13) communicate with each together by near field communications;
   establishing direct contact between the mobile device (12) and vibration means (15); and
   implementing an authentication procedure between the first and second near field communication means (11, 13) of the vehicle and of the mobile device in which:
   i) placing the mobile device (12) in direct contact with the receptacle (14) causing the first near field communication means (11) to emit a request signal (Sr) toward the second near field communication means (13), the request signal (Sr) comprising a predetermined combination of vibratory signals (Sv) and of near field communications signals (Snfc), and
   ii) the second near field communication means (13) emits, in return, a response signal (Sa) only when the second near field communication means (13) has received the request signal according to a predetermined format.

* * * * *